(12) United States Patent
Yang

(10) Patent No.: US 7,756,947 B2
(45) Date of Patent: Jul. 13, 2010

(54) APPARATUS, SYSTEMS, AND METHODS TO SUPPORT SERVICE CALLS IN AN ELECTRONIC SERVICE NETWORK

(75) Inventor: Xiao Ping Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 11/534,486

(22) Filed: Sep. 22, 2006

(65) Prior Publication Data

US 2007/0055772 A1     Mar. 8, 2007

Related U.S. Application Data

(63) Continuation of application No. PCT/CN2005/000924, filed on Jun. 25, 2005.

(51) Int. Cl.
*G06F 15/16* (2006.01)
*G08B 9/00* (2006.01)

(52) U.S. Cl. .................. 709/217; 709/227; 340/286.02

(58) Field of Classification Search ............ 340/825.72, 340/825.69, 825.08, 825.19; 709/223–226
See application file for complete search history.

(56) References Cited

U.S. PATENT DOCUMENTS

| | | | |
|---|---|---|---|
| 4,777,488 A * | 10/1988 | Carlman et al. | 340/825.72 |
| 5,592,676 A | 1/1997 | Bonnafoux | |
| 5,790,803 A | 8/1998 | Kinoshita et al. | |
| 5,926,111 A * | 7/1999 | Davis et al. | 340/825.63 |
| 6,366,196 B1 * | 4/2002 | Green et al. | 340/286.09 |
| 2002/0123983 A1 * | 9/2002 | Riley et al. | 707/1 |
| 2002/0190919 A1 * | 12/2002 | Lee | 345/1.3 |
| 2003/0210277 A1 * | 11/2003 | Harada | 345/810 |
| 2005/0130717 A1 * | 6/2005 | Gosieski et al. | 455/575.2 |
| 2008/0094185 A1 * | 4/2008 | Kreiss | 340/286.09 |
| 2009/0049195 A1 | 2/2009 | Yang et al. | |

FOREIGN PATENT DOCUMENTS

CN     1131859 A     9/1996

(Continued)

OTHER PUBLICATIONS (ASF: Standards-based Systems Management, Intel Corporation, Copyright 2002).*

(Continued)

*Primary Examiner*—Joseph E Avellino
*Assistant Examiner*—Afshawn Towfighi
(74) *Attorney, Agent, or Firm*—Schwegman, Lundberg & Woessner, P.A.

(57) ABSTRACT

In an embodiment, an apparatus, method, and/or system support a service request made by a computer user in an Internet café or similar electronic service environment. A user may operate a café-provided user terminal in a multi-terminal network controlled by a café service console. The user may operate a switch on the terminal to transmit a service request to the service console. A visible and/or audible indication may be provided to the user, via a suitable indicator on the terminal, regarding the status of the user's service request. The user's service request may be transmitted to, and the indication may be received by, suitable terminals of an input/output module located in the user terminal. Other embodiments are described and claimed.

22 Claims, 11 Drawing Sheets

FOREIGN PATENT DOCUMENTS

| | | |
|---|---|---|
| CN | 1300230 A | 6/2001 |
| CN | 1323000 A | 11/2001 |
| CN | 1416093 A | 5/2003 |
| CN | 1525351 | 9/2004 |
| JP | 2000-358028 | 12/2000 |
| WO | WO-0031672 A1 | 6/2000 |
| WO | WO-00/61253 | 10/2000 |
| WO | WO-2004/021655 A1 | 3/2004 |
| WO | WO-2007000072 A1 | 1/2007 |

OTHER PUBLICATIONS

Chinese Application Serial No. 200580050238.4, Office Action mailed on Apr. 3, 2009, 13 pgs.

Chinese Application No. 200580050246.9, Office Action mailed on Apr. 3, 2009, 8 pgs.

* cited by examiner

APPARATUS, SYSTEMS, AND METHODS TO SUPPORT SERVICE CALLS IN AN ELECTRONIC SERVICE NETWORK

This application is a continuation under 35 U.S.C. 111(a) of International Application No. PCT/CN2005/000924, filed on 25 Jun. 2005, which is incorporated herein by reference.

TECHNICAL FIELD

Embodiments of the inventive subject matter relate in general to network apparatus, systems, and methods and, in particular, to services in an Internet café, training center, office network, or like environment.

BACKGROUND

An "Internet café" is a place in which Internet access may be provided, and in which food and beverages may be served. Some Internet cafés are simpler and may provide only Internet access to their customers. Typically, an Internet café may contain a number of computers, a printer, and perhaps a scanner.

Some cafés provide a network of computer terminals with WWW (World Wide Web) on-line access; single and/or multi-user computer games; high-quality audio entertainment; a range of email and news support software; a document/image scanning and editing system; a printing system; and dial-in telephone connections to the Internet from outside the café.

Within Internet cafés, it has become increasingly necessary to provide some level of IT (Information Technology) support such as, for example, an individual who is available to help users. Currently, in Internet cafés it is often difficult to get immediate attention and help for services. This is because, in this environment, there are generally few service personnel to serve many PC users (e.g., greater than 100) in a large space. Typically, in Internet cafés when users need IT or some other service, they must personally search for an IT specialist or waiter or attempt to get the attention of such service personnel, which diminishes the quality of the Internet café experience.

In an attempt to solve the problem, some Internet cafés have increased the size of their service staffs.

Others have installed built-in telephone networks, providing a separate, standard telephone at each Internet café table or desk. A computer user may use the telephone to dial the number of an IT support person, to request service and/or assistance.

Also, some Internet cafés have installed a ring-call system, in which a button is built into each Internet café table. An Internet café customer may press the button, thus audibly and/or visibly signaling to service personnel that the customer desires service.

However, these known solutions, which require additional service personnel and/or dedicated request-entering equipment, are expensive and often ineffective.

BRIEF DESCRIPTION OF THE DRAWINGS

Embodiments of the inventive subject matter may be best understood by referring to the following description and accompanying drawings, which illustrate such embodiments. In the drawings.

DETAILED DESCRIPTION

In the following detailed description of some embodiments of the invention, reference is made to the accompanying drawings that form a part hereof, and in which are shown by way of illustration, but not of limitation, some specific embodiments of the invention. These embodiments are described in sufficient detail to enable those skilled in the art to understand and implement the inventive subject matter, and it is to be understood that other embodiments may be utilized and that mechanical, structural, electrical, functional, and/or procedural changes may be made without departing from the spirit and scope of the disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of embodiments of the invention is defined only by the appended claims, along with the full scope of equivalents to which such claims are entitled.

Figure 1:
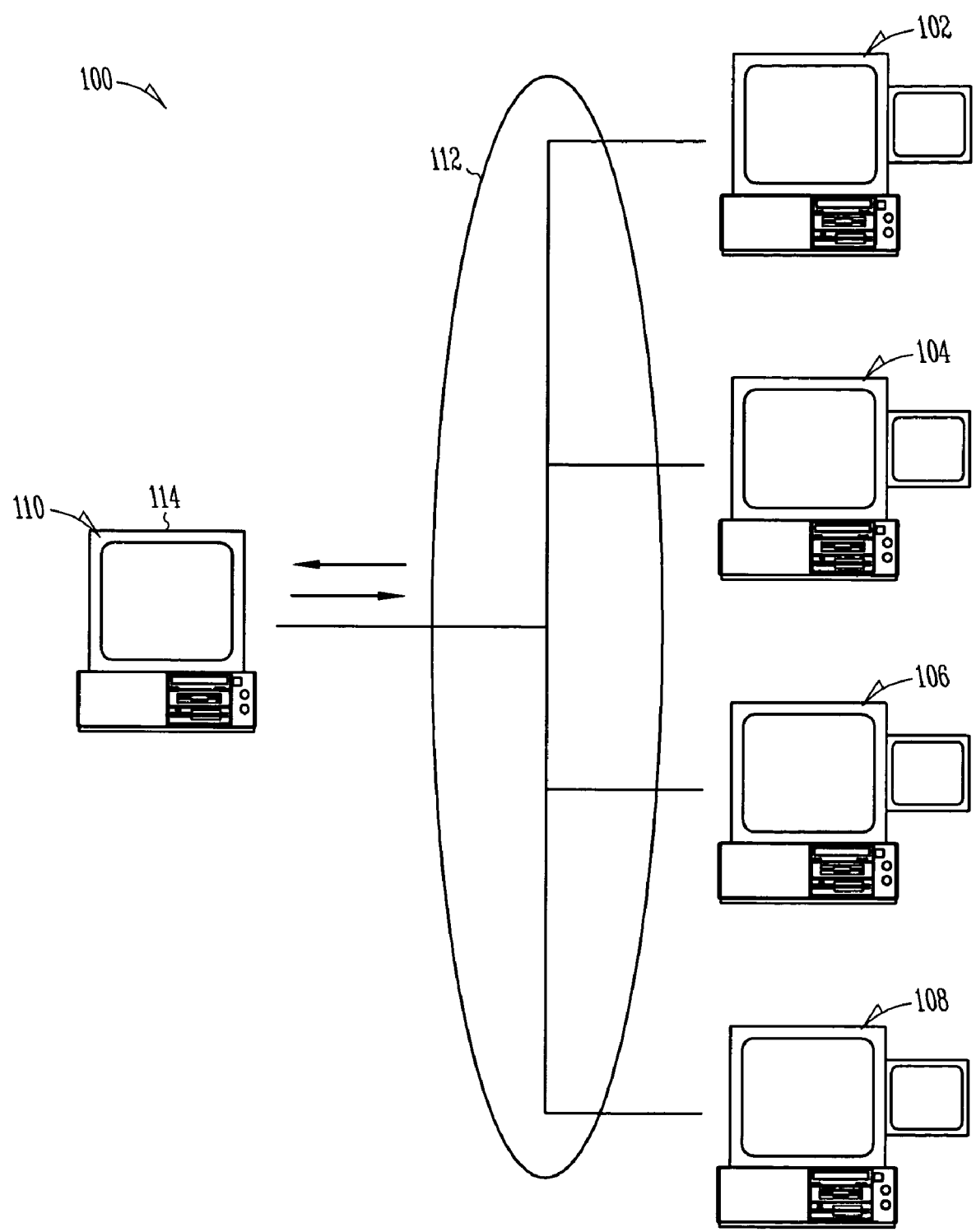
FIG. 1 depicts a schematic diagram of an electronic service environment according to an embodiment of the inventive subject matter.

FIG. 1 depicts a schematic diagram of an electronic service environment according to an embodiment of the inventive subject matter. System 100 may comprise an "electronic service network", which may also be referred to herein as an "electronic service environment". An "electronic service environment" may assume different forms, such as an "Internet café". As other examples, an "electronic service environment" may be an electronic classroom (e.g., a classroom in which computer-related and/or computer-based skills are taught) or an electronic office (e.g., an organization of any size and at any hierarchical level whose members utilize computer-based applications). In an "electronic service environment", a plurality of individual user stations are coupled to a network that is served by one or more administrators who wait for service requests from users and respond to such requests by assisting users.

System 100 may comprise a network 112, which may be operatively coupled to one or more Internet café user terminals 102, 104, 106, and 108, and to at least one service console 110. An Internet café user terminal 102, 104, 106, and 108 may be a fully functional personal computer ("PC"), or it may be a café-provided user terminal, console, or chassis to which a café user's computer may be operatively coupled.

The at least one service console 110 may be a fully functional PC, or it may be less than a fully functional PC. A service console 110 may comprise one or more electronic modules, including a motherboard (not shown), and various additional electronic boards and/or modules (not shown), including a network board (not shown) to couple the service console 110 to a network, such as network 112. Service console 110 may also include a display 114, a plurality of keys and/or keyboard (not shown), and a pointing device (not shown). In an embodiment, display 114 is a touch-screen display.

Figure 2:
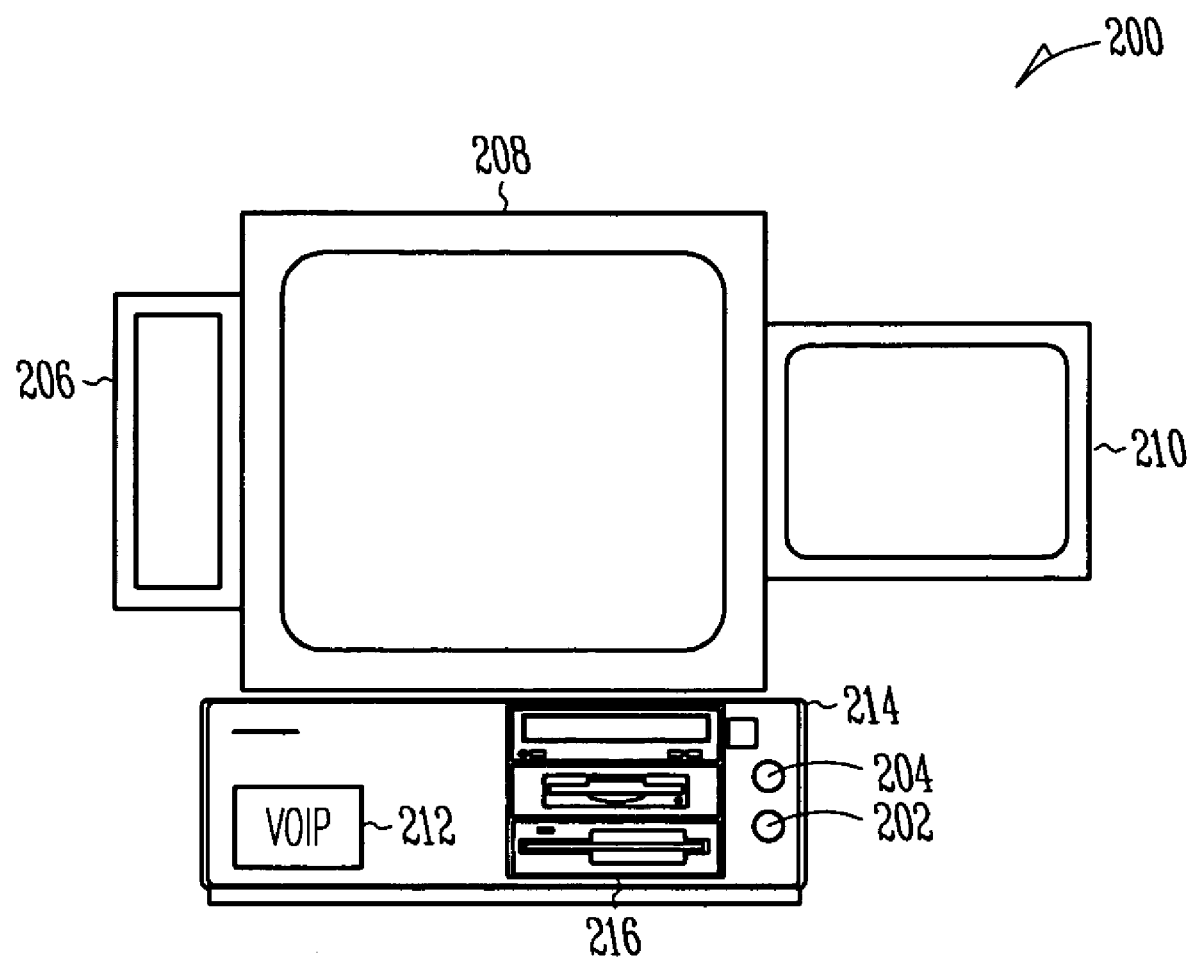
FIG. 2 depicts an example terminal in a system according to an embodiment of the inventive subject matter.

FIG. 2 depicts an example of a terminal 200 in the system 100 (refer to FIG. 1) such as user terminals 102, 104, 106, 108 in the system 100, according to an embodiment of the inventive subject matter. Terminal 200 may comprise a main housing 214 containing a plurality of electronic modules, such as a rotating-media memory module 216, a Voice-Over-Internet-Protocol ("VOIP") module 212, a motherboard (not shown), and various additional electronic boards and/or modules (not shown), including a network board (not shown) to couple the terminal 200 to a network, such as network 112 (FIG. 1). Terminal 200 may also comprise a keyboard (not shown), such as a standard PC keyboard, and a pointing device such as a mouse (not shown).

A dedicated switch 202, such as a button-type device or other device, may be built into the main housing 214 of terminal 200. Dedicated switch 202 may be operable by a user to transmit a user service request to a service console, such as service console 110 (FIG. 1). In an embodiment, dedicated switch 202 is used only for this purpose.

A visible indicator 204 (such as a light-emitting diode ("LED") or light bulb) and/or a sound transducer 206, such as one or more loudspeakers, may also be provided to communicate any desired service status information to the user terminal 200. Visible indicator 204 and/or sound transducer 206 may be activated by service console 110 (FIG. 1) upon receipt of the user's service request, for example, to provide an acknowledgement to the user that his or her request has been received.

The user terminal 200 may have a main display 208, and it may also have an auxiliary or second display 210 (e.g. an LCD display). In an embodiment, either or both the main display 208 and the second display 210 are touch-screen displays. The main display 208 may display computer-based activities that may be characterized as the primary activities of interest to the user, such as electronic mail, computer games, scanning documents or visual media, downloading and uploading visual and/or audio media, and other computer-based activities.

The second display 210 provides for visual communication between the user terminal 200 and the service console, for purposes other than the user's primary activities, such as to order food, beverages, or other items or local services, such as IT assistance or table service, as explained further below. Also, inclusion of an optional Voice-Over-Internet-Protocol ("VOIP") module 212 permits the user to communicate with the IT personnel through audible communication. VOIP module 212 may include suitable microphone and loudspeaker elements (not shown).

Embodiments of the inventive subject matter create a novel paradigm for electronic service environments. This new usage model includes a user-friendly and low-cost electronic service network.

In an embodiment, the electronic service network may include a built-in service switch (e.g., a button) on a personal computer ("PC"), interactive visual and/or audio communication, and Internet protocol ("IP") network functions. Some features of the electronic service environment include the following.

1) A user may call for help (one-button call), simply by pushing a dedicated service button or switch 202 to thereby send a request for IT service or another type of service to the service console, so long as the user PC's power cord is plugged into a power outlet and the PC is connected to the network 112 (FIG. 1). That is, this operation is capable of functioning in S5 or S0/S3 low-power consumption states (discussed further below), and it does not require the presence of an operational or active Operating System ("OS"). Thus, activation of the dedicated switch 202 is effected either during the presence of an active O/S or during the absence of an active O/S.

2) If an operational OS is present (i.e. booted up), then, in addition to sending a help request as in 1) above, a user may select additional service options through the second display 210 associated with or coupled to the terminal 200. For example, the user may choose to order food, drinks, or other items and/or services. In this mode, the user may also choose to talk with remote service personnel through VOIP module 212.

3) Whether an operational OS is present or not, or if the PC is in S5 or S0/S3 low-power consumption states, visible indicator 204 on the terminal 200 may provide the user visual feedback to indicate that the service request has been received by the service console and will be processed. Thus, the activation by the service console 110 (FIG. 1) of the visible indicator may occur independently of a state of the user terminal (102, 104, 106, 108, FIG. 1 or 200, FIG. 2), wherein the state of the user terminal is S5 low-power consumption mode or S0/S3 low-power consumption mode.

In a typical PC, an Advanced Configuration and Power Interface ("ACPI") enables at least six modes of low-power consumption:

| | | |
|---|---|---|
| Active | (S0) | Computer is fully powered ON |
| Standby | (S1) | Hard drive and video card are idle |
| Sleep | (S2) | Hard drive, video card, and central processing unit ("CPU") are idle |
| Suspend | (S3) | ALL devices are powered down; information in random access memory ("RAM") is maintained with nominal charge |
| Hibernation | (S4) | Data in memory is copied to the hard drive hibernation file, and the computer is powered down |
| Power OFF | (S5) | Computer is fully powered OFF |

S1 is the simplest energy-saving state, often used in older systems whose drivers or hardware won't behave well with more sophisticated levels of power management. A system at the S1 power level simply shuts down the hard drive(s) and monitor, but it leaves everything else running normally.

S2 offers greater power savings than S1, because it not only powers down the monitor and drives, but it also cuts power to the CPU and its cache.

S3 is a deeper power savings mode that shuts down almost everything except for a trickle of power needed to maintain the contents of RAM and to listen for a wake-up command.

S4 is fundamentally different from levels S1 to S3. It is a hibernation mode, where the system stops all activity. But S4 is also different from the simple power-off of level S5 because, before powering down, the S4 hibernation system writes the contents of RAM and some CPU settings to a special file on the hard drive.

S5 is the highest power savings mode, representing a complete power-off, such as that achieved by a shut-down command.

Figure 3:
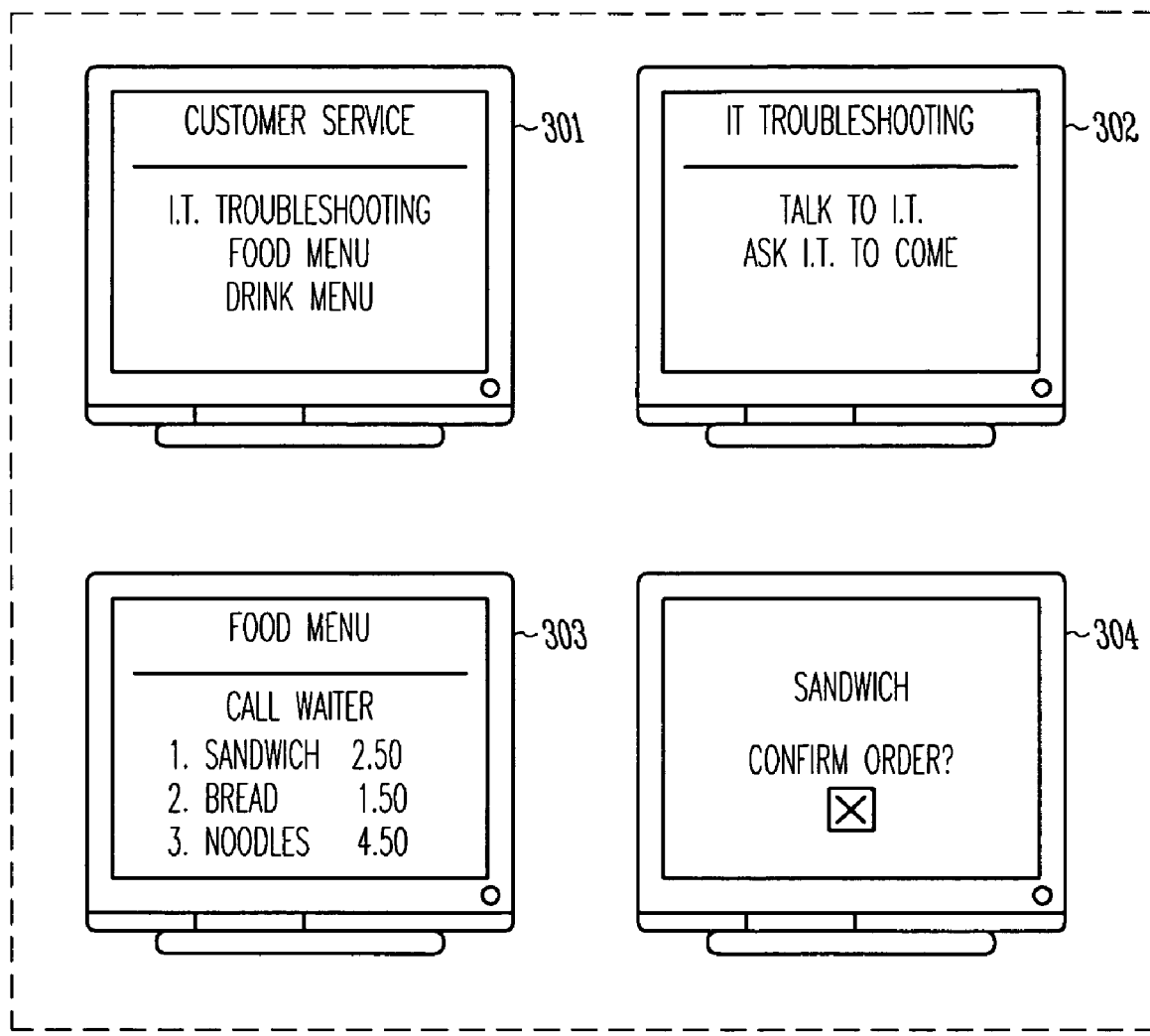
FIG. 3 depicts different possible screen views on a second display of a user terminal in a system according to an embodiment of the inventive subject matter.

FIG. 3 depicts different possible screen views 301-304 on a second display 210 of a user terminal 200 (FIG. 2) in a system 100 (FIG. 1) according to an embodiment of the inventive subject matter. When a user pushes a button or switch 202 (assuming the OS is currently active) of the user terminal 200, the second display 210 may turn on and display a customer service menu, an example of which is shown in screen view 301. From this screen 301, the user may obtain IT service and/or order food and/or drinks and/or other items. In this example, the second display 210 may display three different menu options: IT service or troubleshooting, a food menu, and a drink menu. The user may select from the menu options in any suitable manner, including touching the corresponding portion of the screen, pointing with a pointing device, and depressing one or more keys on a keyboard (not shown).

"Suitable", as used herein, means having characteristics that are sufficient to produce the desired result(s). Suitability for the intended purpose can be determined by one of ordinary skill in the art using only routine experimentation.

By selecting the IT service or troubleshooting menu (screen view 302), the user may choose to talk with the IT personnel or ask the IT personnel to come to the user's location. If the user chooses to talk with the IT personnel, a communication channel is set up, using VOIP for example, to connect the user terminal 200 (FIG. 2) to the service console 110 (FIG. 1).

By selecting the food and drink menu (screen view 303), the prices of various food and drink items in the Internet café are displayed. The user may then order the food and/or drink items on-line or choose to call a waiter to place an order. If an order is placed on-line, a confirmation may be provided (screen view 304).

Embodiments set forth in this disclosure may be applied to devices and apparatus other than a personal computer such as, for example, a portable device such as a laptop computer, a wireless communicator or a hand-held device such as a cellular phone, personal digital assistant, and the like.

The system 100 (FIG. 1) can provide voice contact between an Internet café user and a service administrator, using built-in VOIP module 212 (FIG. 2), and the system 100 can further provide a visible indicator 204, so that users may receive convenient and interactive service in Internet cafés. Because elements of the inventive subject matter may be integrated into the PC system itself, compared with other solutions (for example, a separate telephone system or ring-call system), the cost of implementing a system incorporating the inventive subject matter may be less. Thus, embodiments of the inventive subject matter may provide an inexpensive and user-friendly solution for IT services in electronic service environments such as Internet cafés.

A one-button selection by the user can bring up an E-commerce menu on a second display 210 (FIG. 2) on the user terminal 200. The user can conveniently and visually order items by navigation buttons (suitably located, e.g. on the terminal 200) or by touch-screen locations on second display 210, without interrupting other computer-based activities being displayed on the main display 208.

Figure 4:
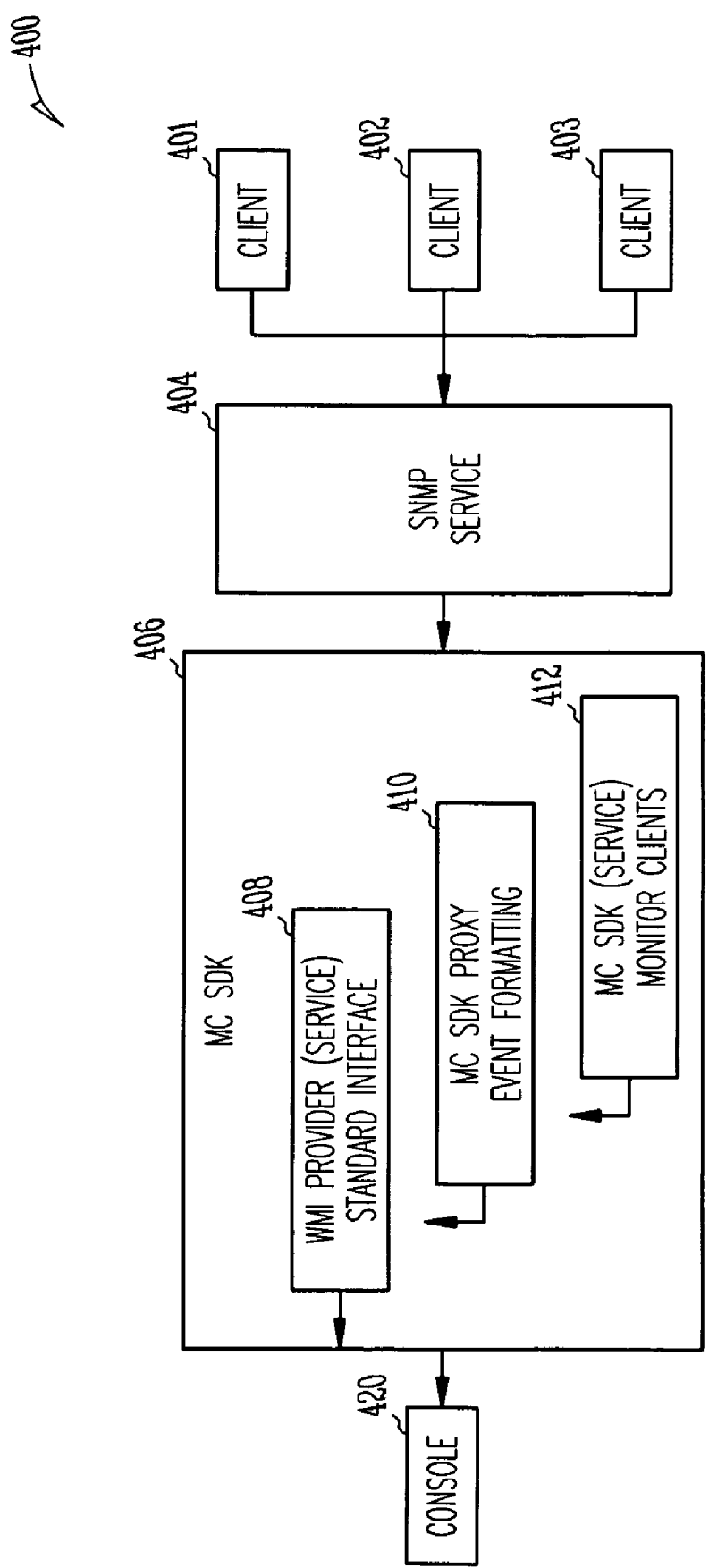
FIG. 4 depicts a block diagram showing the flow of a Platform Event Trap ("PET") between a client and a console of an electronic service network according to an embodiment of the inventive subject matter.

FIG. 4 depicts a block diagram showing the flow of a Platform Event Trap ("PET") between a client 401, 402, or 403 and a console 420 of an electronic service network 400, according to an embodiment of the inventive subject matter.

Clients 401-403 are coupled to SNMP (Simple Network Management Protocol) 404, which in turn may be coupled to MC SDK (Management Control Software Development Kit) 406. MC SDK 406 may include a WMI (Windows® Management Improved) Provider (Service) Standard Interface 408, an MC SDK Proxy 410 to provide event-formatting functions, and an MC SDK 412 (Service) to monitor clients. MC SDK 410 may comprise a dynamic link library. MC SDK 406 is coupled to console 420.

A PET may be generated by an ASF (Alert Standard Format) control module (e.g. 710, FIG. 7) in a client 401-403. The PET is used to notify the console 420 of an event occurring in a client 401-403. When the PET reaches the console 420, the PET may be handled by Simple Network Management Protocol (SNMP), as further explained below regarding FIG. 8.

Figure 5:
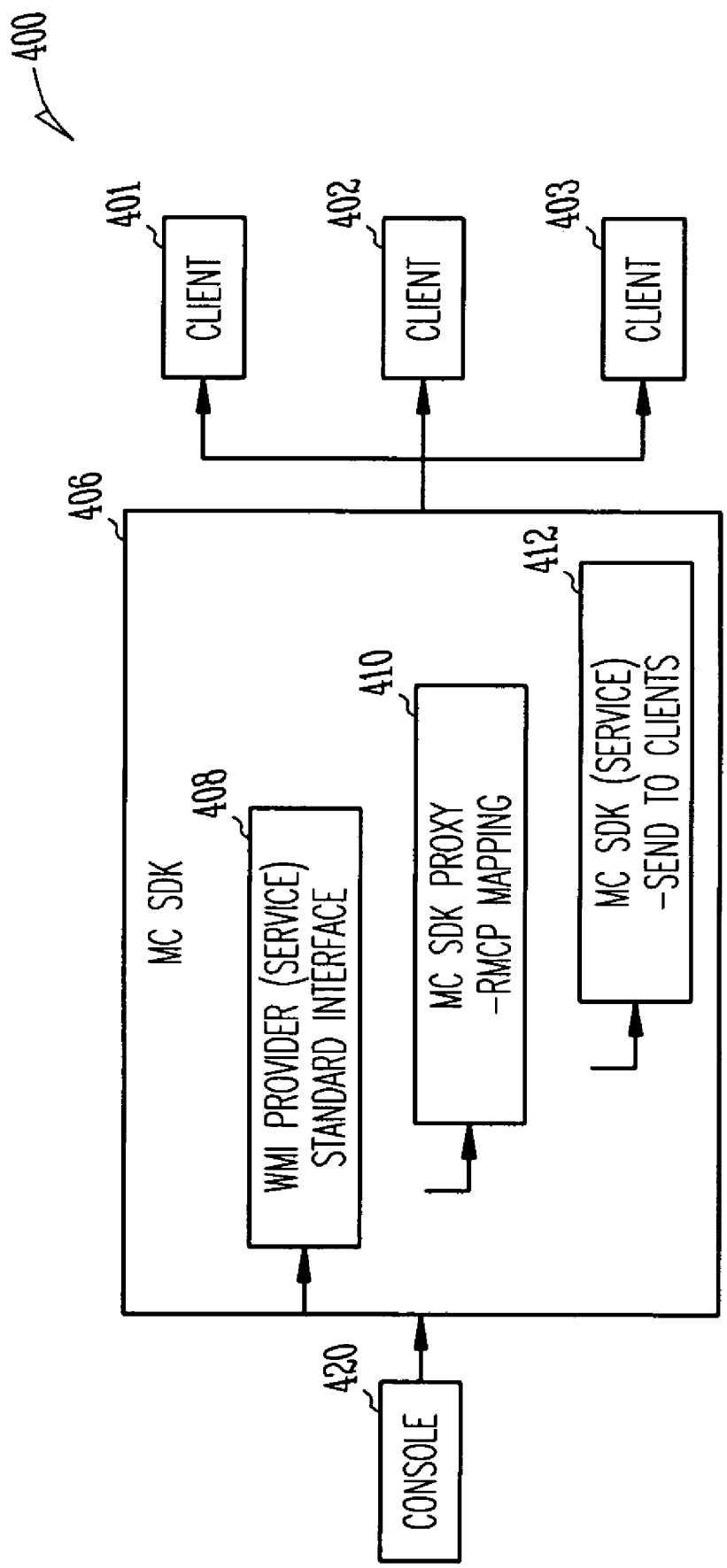
FIG. 5 depicts a block diagram showing the flow of a Remote Management Control Protocol command between a console and a client of an electronic service network according to an embodiment of the inventive subject matter.

FIG. 5 depicts a block diagram showing the flow of a Remote Management Control Protocol (RMCP) command between a console 420 and a client 401, 402, or 403 of an electronic service network 400 according to an embodiment of the inventive subject matter.

As in FIG. 4, console 420 and clients 401-403 may be coupled to MC SDK 406. MC SDK 406 may include WMI (Windows® Management Improved) Provider (Service) Standard Interface 408, an MC SDK Proxy 410, and an MC SDK 412 (Service). MC SDK Proxy 410 may provide RMCP (Remote Management Control Protocol) mapping. MC SDK 412 may send RMCP packets to clients 401-403. RMCP packets are explained in greater detail below regarding FIG. 8.

Figure 6:
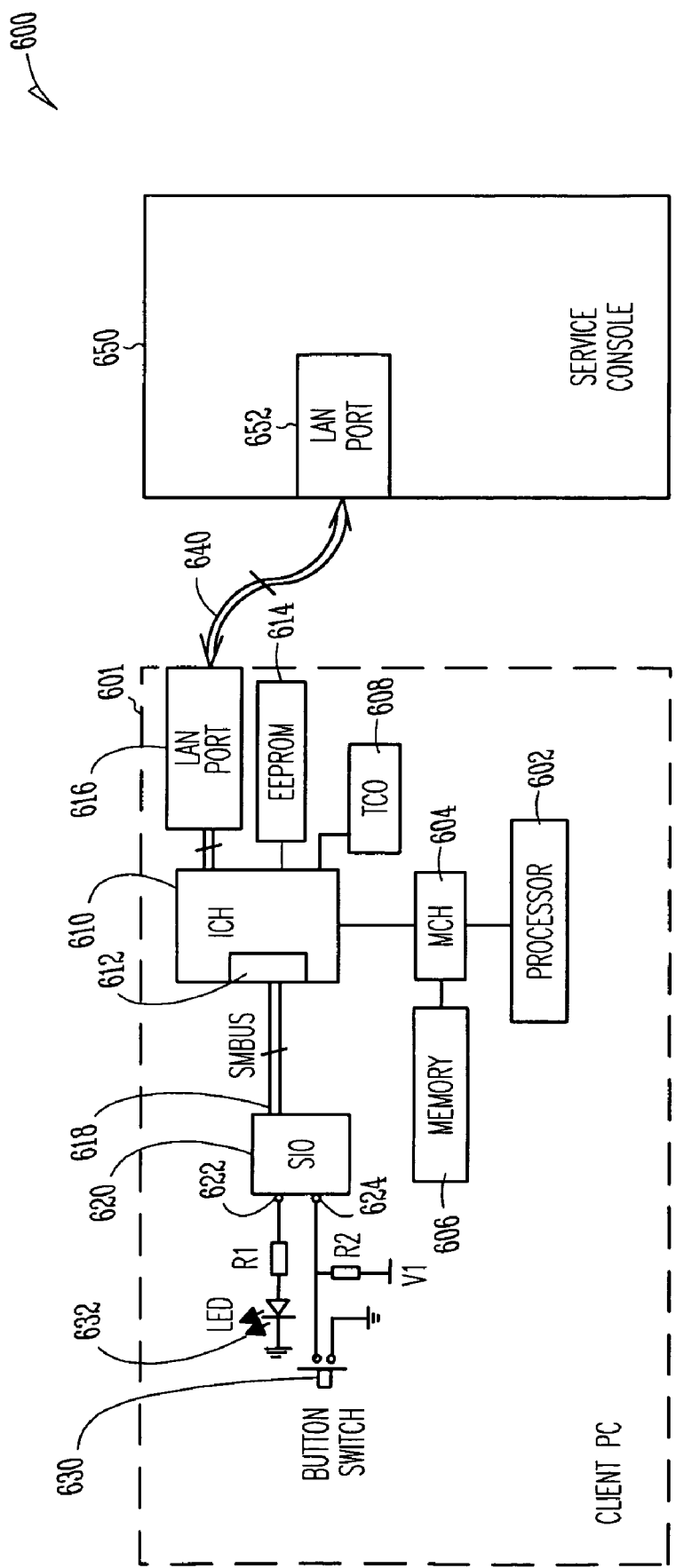
FIG. 6 depicts elements in an electronic service network according to an embodiment of the inventive subject matter.

FIG. 6 depicts elements in an electronic service network 600 according to an embodiment of the inventive subject matter.

The electronic service network 600 may include one or more clients 601 and at least one service console 650. Exemplary client 601 may include at least one processor 602 to which a memory control hub ("MCH") 604 may be coupled. At least one memory 606 may be coupled to MCH 604.

An input/output control hub ("ICH") 610, having an ASF management core 612, may be coupled to MCH 604. A Total-Cost-Of-Ownership module ("TCO") 608 may be coupled to ICH 610. An EEPROM (electrically erasable programmable read-only memory) 614 may also be coupled to MCH 604. In addition, a LAN (local area network) port 616 may also be coupled to MCH 604. LAN port 616 may be coupled to LAN port 652 of service console 650 via a suitable bus or connector, such as bus 640.

A Super I/O ("SIO") 620 may be coupled to ICH 610 via a suitable bus or connector, such as SM (system management) bus 618. SIO 620 may include a plurality of terminals or pins, including a first pin 622 and a second pin 624. In an embodiment, pin 622 may be a remote control sensor pin, and pin 624 may be a legacy sensor or ASF sensor pin. Pin 624 may also be referred to herein as a "one-button call" sensor.

Pin 622 may be coupled via a suitable resistor R1 to a first terminal of a suitable indicator. In an embodiment, the indicator may take the form of a light, such as light-emitting diode 632, having a second terminal coupled to ground potential. In another embodiment, the indicator may take the form of a suitable sound transducer to produce an audible signal. The indicator could also be any suitable element to generate a combination of visible and audible signals. Pin 624 may be coupled via a suitable resistor R2 to a suitable potential V1.

Pin 624 may also be coupled to a first terminal of a suitable switch, such as button switch 630, having a second terminal coupled to ground potential.

In the operation of an embodiment illustrated in FIG. 6, when the button switch 630 is pushed, the legacy sensor or ASF sensor associated with pin 624 of SIO 620 will detect this, and SIO 620 will send a help request to ASF management core 612 of ICH 610 via SMbus 618. From ICH 610, the help request is sent through LAN port 616, over bus 640 to LAN port 652 of console 620, where the service request is processed.

Once the help request reaches the console 650, a feedback command (e.g. "LED ON"), which may be based on a RMCP (remote management and control protocol) of ASF technology, may be automatically sent back to the client 601. After the ASF management core 612 processes the feedback command from console 650, the feedback command is sent to the SIO 618 via SMbus 618. The command is output by the remote control sensor or LED feedback sensor pin 622 of SIO 618, and it turns on the LED indicator 632 or other suitable indicator.

When the user's help request has been satisfied by an operator of the console or by other personnel within the electronic service environment, another command (e.g., "LED OFF"), may be sent from the console 650 to the remote control sensor or LED feedback sensor pin 622 of SIO 618 to turn off the LED indicator 632 or other indicator.

Figure 7:
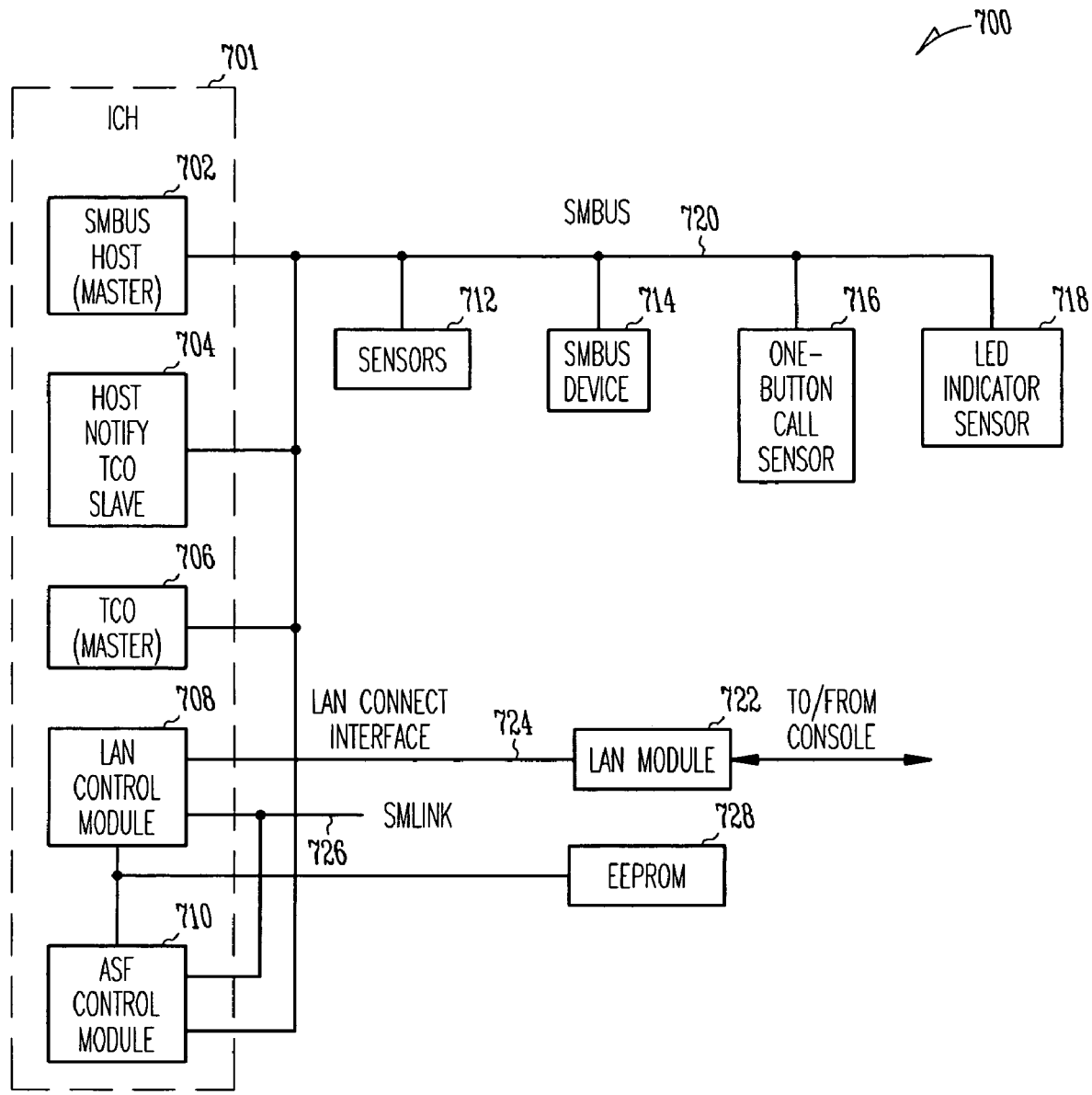
FIG. 7 is a block diagram illustrating the input/output ("I/O") control hub ("ICH") of FIG. 6, and some of its associated circuitry, in greater detail according to an embodiment of the inventive subject matter.

FIG. 7 is a block diagram illustrating the input/output ("I/O") control hub ("ICH") 610 of FIG. 6, and some of its associated circuitry, in greater detail according to an embodiment of the inventive subject matter. ICH 701 of FIG. 7 may be similar or identical to ICH 610 illustrated in FIG. 6. ICH 701 and the associated circuitry shown in FIG. 7 are indicated generally by reference number 700.

ICH 700 may have an SMbus host (master) 702 operatively coupled to a host notify TCO slave 704, to a TCO (master) 706, to a LAN control module 708, and to an ASF control module 710. These elements may also be operatively coupled to sensors 712, to one or more SMbus devices 714, to one-button call sensor 716, and to LED indicator sensor 718 via SMbus 720.

In an ASF embodiment of a one-button call with LED feedback, the one-button call sensor 716 is used to send a help request. The LED indicator sensor 718 is used to receive a suitable remote control command (e.g. "LED ON" or "LED OFF") from the console.

LAN control module 708 may be operatively coupled to a LAN module 722 (e.g., an Intel® 82452 LAN controller) via a LAN connect interface 724. The LAN control module 708 and the ASF control module 710 may also be operatively coupled to an SMLink 726 and to an EEPROM 728.

An embodiment of the present inventive subject matter provides an electrical solution to implement the IT/service calls in different states (e.g., S5, S3, S0) by utilizing ASF technology. Although an embodiment is illustrated utilizing ASF technology, the inventive subject matter is not limited to implementation in ASF technology. The inventive subject matter is not only helpful for remote troubleshooting in an Internet café, but it also can provide remote service support and/or E-commerce support (such as ordering drinks, food, and other items). Moreover, the inventive subject matter may operate in different kinds of low-power consumption states (e.g. S5, S3, S0).

Embodiments set forth in this disclosure may be applied to devices and apparatus other than a personal computer such as, for example, a portable device such as a laptop computer, a wireless communicator, a hand-held device such as a personal digital assistant, and the like.

With the integration of VOIP and a human-perceivable indicator (e.g. an audible or visible indicator) to provide suitable feedback for request confirmation, users may obtain convenient and interactive service in Internet cafés and other electronic service environments. In an embodiment, the constituent elements are integrated into the user's terminal or personal computer system itself, compared with other solutions (for example a telephone system), so additional hardware is minimized. Thus, embodiments of the inventive subject matter may provide an inexpensive and efficient solution for IT services in Internet cafés. E-commerce support is another advantage of the usage model. One-button can directly bring up an E-commerce menu on a second LCD display panel on the chassis. The end-user can conveniently and visually order items by navigation buttons without interrupting the user's other computer-based activities.

Figure 8:
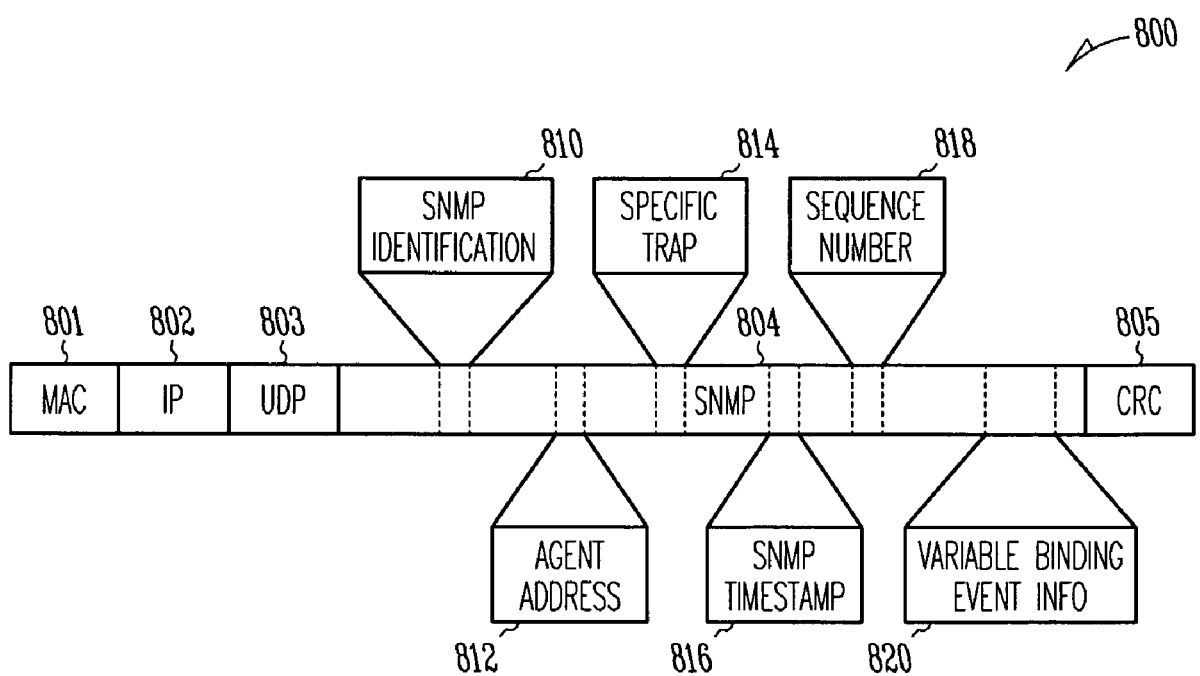
FIG. 8 depicts a Platform Event Trap ("PET") packet, according to an embodiment of the inventive subject matter.

FIG. 8 depicts a Platform Event Trap ("PET") packet 800, according to an embodiment of the inventive subject matter. A PET packet 800 may include a plurality of different fields, which will now be explained.

MAC (medium access control address) 801 provides a unique address identifier for the PET packet 800. IP 802 is an Internet protocol address. UDP 803 refers to a user datagram protocol.

SNMP (simple network management protocol) field 804 may include several fields, such as SNMP identification 810, agent address 812, specific trap 814, SNMP timestamp 816, sequence number 818, and variable binding event info 820. SNMP identification 810 field may itself include several fields, such as SNMP version, a community string (e.g. "public" or other values), and an enterprise OID (object identifier).

An agent address field 812 may provide the server (IP) address.

A specific trap field 814 may identify a type of event (e.g. an over-temperature event).

An SNMP timestamp field 816 may be a timestamp of suitable length (e.g. 32 bits) used in SNMP for time-based ordering.

A sequence number 818 may describe the index of each PET frame. For example, an ASF alert-sending device may retransmit each PET frame two times for a total of three times per event. All three transmissions should occur within a one-minute window and contain the same sequence number field. A management console should treat identical events it receives outside the one-minute window as a new event.

A variable binding event info field 820 may detail the system and sensor information for an event (e.g. the level of severity).

A CRC (cyclic redundancy check) 805 may be used for error detection purposes.

It will be understood that additional or fewer fields may be used in a PET packet 800.

Figure 9:
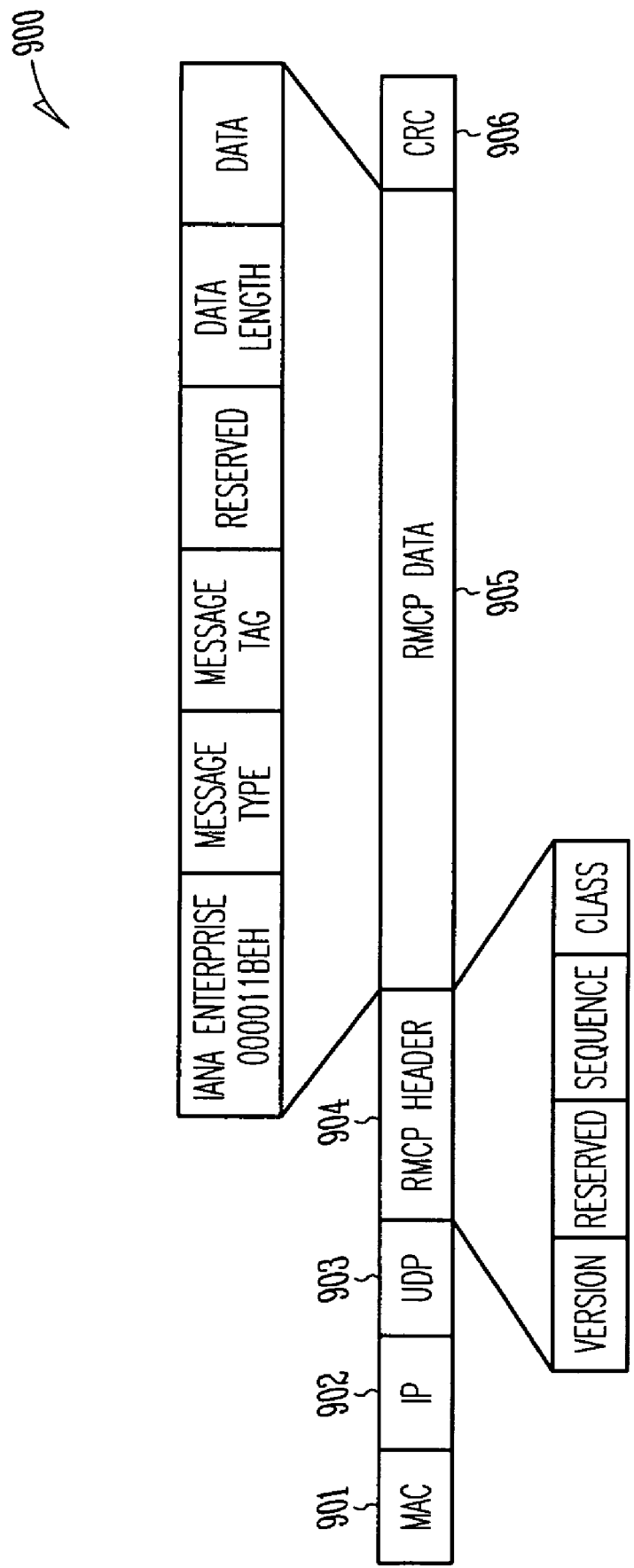
FIG. 9 depicts an acknowledgment packet, according to an embodiment of the inventive subject matter.

FIG. 9 depicts an acknowledgment packet 900, according to an embodiment of the inventive subject matter. In an embodiment, an acknowledgement packet 900 may comprise an RMCP packet, which may include a plurality of different fields, which will now be explained.

MAC field 901, IP field 902, UDP field 903, and CRC field 906 may contain information of the types defined above regarding PET packet 800, described with respect to FIG. 8.

RMCP header field 904 may comprise a version field to identify the RMCP version; a reserved field; a sequence field used for ordering and acknowledging; and a class field to identify a class of operation.

RMCP data 905 field may comprise an IANA (Internet Assigned Numbers Authority) enterprise field to identify the message creator; a message type field to provide an ASF command (e.g. reset); a message tag field to pair request and response commands; a reserved field; a data length field to identify the length of the subsequent data field; and a data field to pass information associated with the message type.

It will be understood that additional or fewer fields may be used in an acknowledgment packet 900.

Figure 10:
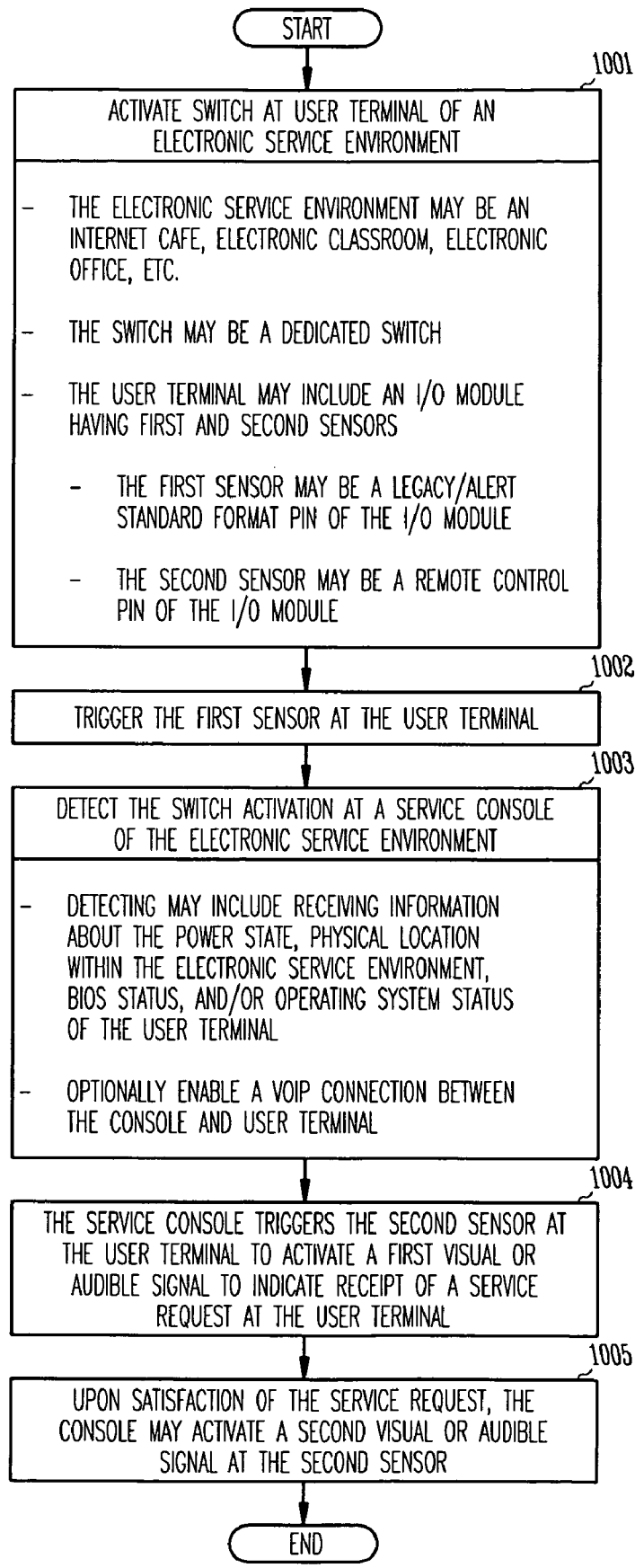
FIG. 10 depicts a flow diagram of one or more methods according to one or more embodiments of the inventive subject matter.

FIG. 10 depicts a flow diagram of one or more methods 1000 according to one or more embodiments of the inventive subject matter.

In 1001, a suitable switch or other response-entry device may be activated at a user terminal of an electronic service environment. The electronic service environment may be an Internet café, electronic classroom, electronic office, or the like. The activation of the response-entry device may be independent of other functioning of the user terminal. In an embodiment, the switch may be a single button (i.e. one-button switch). The switch may be a dedicated switch built into a user's computer, into a separate console, or any other suitable location. The user terminal may include an I/O module (e.g. an SIO) having first and second sensors. The first sensor may be a legacy/ASF pin, and the second sensor may be a remote control pin. However, embodiments of the inventive subject matter are not limited to these specific sensors or pins, and any suitable sensors or pins may be used.

In 1002, the first sensor is triggered at the user terminal.

In 1003, the switch activation is transmitted to and detected at a service console of the electronic service environment. Detecting the switch activation may include receiving information about the power state of the user terminal (e.g. S0, S1, S2, S3, S4, or S5 power states); information concerning the physical location of the user terminal within the Internet café or other electronic service environment; information concerning the basic-input-output-system ("BIOS") status of the user terminal; and/or information concerning the O/S status of the user terminal being operated by the user. Optionally, a VOIP connection may be enabled between the console and the user terminal in response to detecting the activation of the switch in 1001. The VOIP connection enables a Voice-Over-Internet-Protocol ("VOIP") audio and/or visual connection between the console and the user's location, enabling the user terminal 200 (FIG. 2) to communicate with the service console 110 (FIG. 1) through the network 112 (FIG. 1).

In 1004, the service console may transmit a first service status signal to the user terminal, to trigger the second sensor at the user terminal to activate a first visible and/or audible signal to indicate the receipt of a service request from the user at the user's terminal.

In 1005, upon satisfaction of the user's service request, the console may transmit a second service status signal to the user terminal to activate a second visible and/or audible signal at the second sensor. The first and second visible and/or audible signals may be provided by the same or different elements at the user terminal.

The first service status signal may serve to inform the user that a service administrator at the service console has received the user's service request. The second service status signal may inform the user that the user's service request is ready to be completed or satisfied, or has already been satisfied. The service console's activation of a visible and/or audible indicator at the user terminal may occur independently of other operations of the user terminal, so the user may continue to engage in normal computing activities without interruption.

Following 1005, the methods may end.

The operations described herein are just exemplary. It should be noted that the individual activities shown in the flow diagrams do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated. Although the flow diagram of FIG. 10 shows an "End", it may be performed continuously if desired.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment. Thus, other embodiments may be realized, such as that illustrated in FIG. 11, described below.

Figure 11:
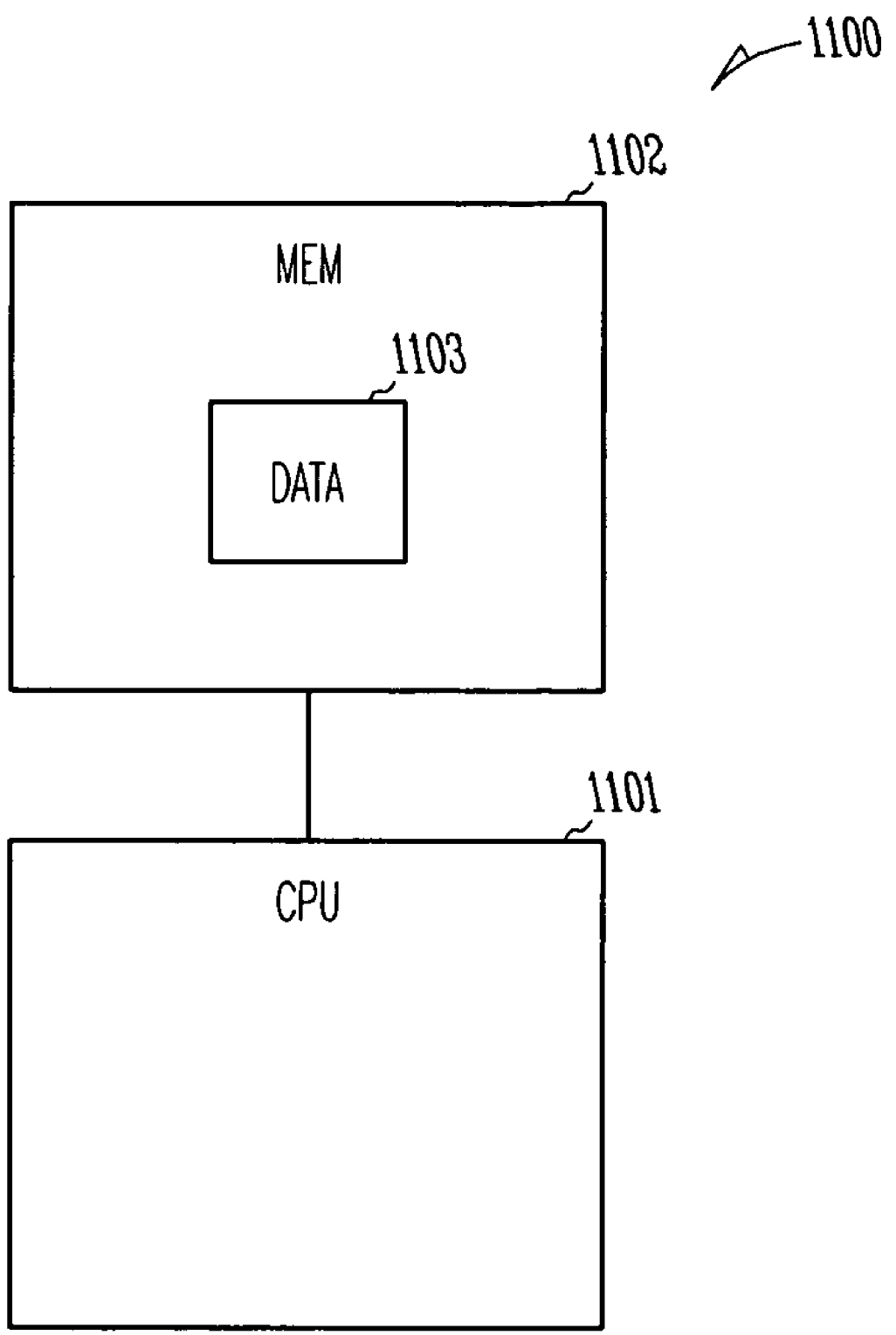
FIG. 11 depicts a block diagram of an article according to various embodiments of the inventive subject matter.

FIG. 11 depicts a block diagram of an article 1100 according to various embodiments of the inventive subject matter. Examples of such embodiments may comprise a computer, a memory system, a magnetic or optical disk, some other storage device, or any type of electronic device or system. The article 1100 may include one or more processor(s) 1101 coupled to a machine-accessible medium such as a memory 1102 (e.g., a memory including an electrical, optical, or electromagnetic conductor). The medium may contain associated information 1103 (e.g., computer program instructions, data, or both) which, when accessed, results in a machine (e.g., the processor(s) 1101) performing the methods disclosed herein. In an embodiment this may include detecting, at a service console of an electronic service environment, activation of a switch triggering a first sensor at a user terminal, and the console triggering a second sensor at the user terminal to activate a first visible or audible signal to indicate receipt of a service request made at the user terminal.

The Abstract is provided to comply with 37 C.F.R. § 1.72 (b) requiring an Abstract that will allow the reader to ascertain the nature of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although exemplary implementations of the inventive subject matter have been depicted and described in detail herein, it will be apparent to those skilled in the relevant art that various modifications, additions, substitutions, and the like can be made without departing from the spirit of the inventive subject matter, and these are therefore considered to be within the scope of the inventive subject matter as defined in the following claims.

What is claimed is:

1. Apparatus comprising:
a terminal to couple to a network having a service console, wherein the terminal includes
a main display to display computer-based activities of primary interest to a user;
a second display to display customer service menu items, wherein the second display is physically separate from the main display;
at least one processor;
an operating system to be executed by the at least one processor, wherein a status of the operating system may be either active or inactive;
a network module;
a switch to transmit a service request to the service console via the network module;
an indicator to receive a service status signal from the service console via the network module whether or not the operating system status is active, wherein the indicator comprises a light, and wherein the service status signal comprises an acknowledgement of receipt of the service request by the service console;
wherein, in response to activation of the service request from the switch, the second display is to display the customer service menu items if the operating system status is active, and wherein the customer service menu items comprise information technology ("IT") troubleshooting and a food menu;
wherein the service console is to activate the indicator in response to activation of the switch, and wherein the service console's activation of the indicator is to occur independently of a power state of the at least one processor, including when the at least one processor is fully powered down; and
wherein the terminal further includes a Voice-Over-Internet-Protocol ("VOIP") module, wherein the terminal is to communicate with the service console via the VOIP module, and wherein the VOIP module is activated in response to activation of the switch if the operating system status is active and if IT troubleshooting is selected.

2. The apparatus according to claim 1, wherein the switch is a dedicated switch for use only to transmit the service request to the service console.

3. The apparatus according to claim 2, wherein the terminal comprises a housing, and wherein the dedicated switch is built into the housing.

4. The apparatus according to claim 1, wherein the switch is a button-type device for use only to transmit the service request to the service console.

5. The apparatus according to claim 1, wherein the indicator comprises a light-emitting diode.

6. The apparatus according to claim 1, wherein the service status signal comprises a notification of the service request being completed.

7. The apparatus according to claim 1, wherein the service console's activation of the indicator is to occur independently of other operations of the terminal.

8. The apparatus according to claim 1, wherein the terminal is operable to transmit the service request in two or more of S0, S3, and S5, power-consumption states of the terminal.

9. The apparatus according to claim 1, wherein the second display is to display a list of food items with associated prices if the food menu is selected, and wherein the second display comprises touch-screen locations.

10. A system comprising:
a network;
an Internet café service console coupled to the network; and
at least one café-provided terminal coupled to the network, wherein the terminal includes
a main display to display computer-based activities of primary interest to a user;
a second display to display customer service menu items, wherein the second display is physically separate from the main display;
at least one processor;
an operating system to be executed by the at least one processor, wherein the operating system status may be either active or inactive;
a network module;
a switch to transmit a service request to the service console via the network module; and
an indicator to receive a service status signal from the service console via the network module whether or not the operating system status is active, wherein the indicator comprises a light, and wherein the service status signal comprises an acknowledgement of receipt of the service request by the service console;
wherein, in response to the service request, the second display is to display the customer service menu items if the operating system status is active, and wherein the customer service menu items comprise information technology ("IT") troubleshooting and a food menu;
wherein the service console is to activate the indicator in response to activation of the switch, and wherein the service console's activation of the indicator is to occur independently of a power state of the at least one processor, including when the at least one processor is fully powered down; and
wherein the terminal further includes a Voice-Over-Internet-Protocol ("VOIP") module, wherein the terminal is to communicate with the service console via the VOIP module, and wherein the VOIP module is activated in response to activation of the switch if the operating system status is active and if IT troubleshooting is selected.

11. The system according to claim 10, wherein the switch is a dedicated switch for use only to transmit a service request to the service console, wherein the terminal comprises a housing, and wherein the dedicated switch is built into the housing.

12. The system according to claim 10, wherein the service status signal comprises an acknowledgement of receipt of the service request by the service console.

13. The system according to claim 10, wherein the second display is to display a list of food items with associated prices if the food menu is selected, and wherein the second display comprises touch-screen locations.

14. A method of operating an Internet café system comprising a user terminal and a service console, wherein the user terminal includes a main display to display computer-based activities of primary interest to a user; a second display to display customer service menu items, the second display being physically separate from the main display and comprising touch-screen locations; a Voice-Over-Internet-Protocol ("VOIP") module, wherein the user terminal is to communicate with the service console via the VOIP module; at least one processor; and an operating system to be executed by the at least one processor, wherein a status of the operating system may be either active or inactive; the method comprising:
- detecting, at the service console, activation of a switch triggering a first sensor at the user terminal, whether or not the operating system status is active;
- the console triggering a second sensor at the user terminal to activate a first visible or audible signal to indicate receipt of a service request made at the user terminal;
- in response to receipt of the service request by the service console, the second display displaying the customer service menu items if the operating system status is active, wherein the customer service menu items comprise information technology ("IT") troubleshooting and a food menu;
- wherein, if IT troubleshooting is selected, the VOIP module is activated;
- wherein, if the food menu is selected, the second display displays a list of food items with associated prices; and
- wherein the service console activates the first visible or audible signal in response to activation of the switch, and wherein the service console's activation of the first visible or audible signal occurs independently of a power state of the at least one processor, including when the at least one processor is fully powered down.

15. The method according to claim 14, further comprising:
upon satisfaction of the user's service request, the console activating a second visible or audible signal at the second sensor.

16. The method according to claim 14, wherein the switch is a dedicated switch.

17. The method according to claim 14, wherein the user terminal comprises an input/output module having the first and second sensors.

18. The method according to claim 14, wherein the first sensor is a legacy/Alert Standard Format pin.

19. The method according to claim 14, wherein the second sensor is a remote control pin.

20. The method according to claim 14, wherein detecting comprises receiving information about the power state of the user terminal.

21. The method according to claim 14, wherein detecting comprises receiving information about the basic-input-output-system status of the user terminal.

22. The method according to claim 14, wherein detecting comprises receiving information about the operating system status of the user terminal.

* * * * *

UNITED STATES PATENT AND TRADEMARK OFFICE
CERTIFICATE OF CORRECTION

PATENT NO. : 7,756,947 B2  Page 1 of 1
APPLICATION NO. : 11/534486
DATED : July 13, 2010
INVENTOR(S) : Xiao Ping Yang It is certified that error appears in the above-identified patent and that said Letters Patent is hereby corrected as shown below:

In column 11, line 67, in Claim 8, delete "S5," and insert -- S5 --, therefor.

Signed and Sealed this

Fourteenth Day of September, 2010

David J. Kappos
*Director of the United States Patent and Trademark Office*